(12) United States Patent
Warashina et al.

(10) Patent No.: US 11,253,999 B2
(45) Date of Patent: Feb. 22, 2022

(54) MACHINE LEARNING DEVICE, ROBOT CONTROL DEVICE AND ROBOT VISION SYSTEM USING MACHINE LEARNING DEVICE, AND MACHINE LEARNING METHOD

(71) Applicant: FANUC CORPORATION, Yamanashi (JP)

(72) Inventors: Fumikazu Warashina, Yamanashi (JP); Yuutarou Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 252 days.

(21) Appl. No.: 16/361,207

(22) Filed: Mar. 22, 2019

(65) Prior Publication Data

US 2019/0299405 A1 Oct. 3, 2019

(30) Foreign Application Priority Data

Mar. 29, 2018 (JP) .............................. JP2018-065093

(51) Int. Cl.
*B25J 9/16* (2006.01)

(52) U.S. Cl.
CPC .............. *B25J 9/163* (2013.01); *B25J 9/1697* (2013.01)

(58) Field of Classification Search
CPC ........ B25J 9/163; B25J 9/1697; B25J 9/0009; B25J 9/0081; B25J 13/08; B25J 19/04; G05B 2219/39393; G05B 2219/40499
See application file for complete search history.

(56) References Cited

U.S. PATENT DOCUMENTS 5,727,132 A * 3/1998 Arimatsu ........... G05B 19/4083
  700/259
8,256,480 B1 * 9/2012 Weber ................... B29C 66/863
  156/359

(Continued)

FOREIGN PATENT DOCUMENTS

JP  H4-352201 A  12/1992
JP  H8-212329 A   8/1996

(Continued)

OTHER PUBLICATIONS

JP-2019150911 Translation (Year: 2018).*

*Primary Examiner* — Jeff A Burke
*Assistant Examiner* — Kyle T Johnson
(74) *Attorney, Agent, or Firm* — Hauptman Ham, LLP

(57) ABSTRACT

A machine learning device includes a state observation unit for observing, as state variables, an image of a workpiece captured by a vision sensor, and a movement amount of an arm end portion from an arbitrary position, the movement amount being calculated so as to bring the image close to a target image; a determination data retrieval unit for retrieving the target image as determination data; and a learning unit for learning the movement amount to move the arm end portion or the workpiece from the arbitrary position to a target position. The target position is a position in which the vision sensor and the workpiece have a predetermined relative positional relationship. The target image is an image of the workpiece captured by the vision sensor when the arm end portion or the workpiece is disposed in the target position.

14 Claims, 6 Drawing Sheets

(56) References Cited

U.S. PATENT DOCUMENTS

| | | | | |
|---|---|---|---|---|
| 9,008,840 B1* | 4/2015 | Ponulak | | G06N 3/049 |
| | | | | 700/250 |
| 2003/0078694 A1* | 4/2003 | Watanabe | | G05B 19/4202 |
| | | | | 700/245 |
| 2012/0259462 A1* | 10/2012 | Aoba | | B25J 9/1697 |
| | | | | 700/245 |
| 2012/0296471 A1* | 11/2012 | Inaba | | B25J 9/163 |
| | | | | 700/253 |
| 2013/0151007 A1* | 6/2013 | Valpola | | B25J 9/1694 |
| | | | | 700/245 |
| 2013/0345718 A1* | 12/2013 | Crawford | | A61B 17/025 |
| | | | | 606/130 |
| 2016/0184997 A1* | 6/2016 | Uchiyama | | B25J 9/1697 |
| | | | | 700/259 |
| 2017/0252922 A1* | 9/2017 | Levine | | G06N 3/0454 |
| 2017/0285584 A1* | 10/2017 | Nakagawa | | B25J 9/1671 |
| 2018/0126553 A1* | 5/2018 | Corkum | | B25J 9/1697 |
| 2018/0304467 A1* | 10/2018 | Matsuura | | B25J 13/06 |
| 2018/0345496 A1* | 12/2018 | Li | | G06T 17/00 |
| 2019/0137954 A1* | 5/2019 | De Magistris | | B25J 9/163 |
| 2019/0217476 A1* | 7/2019 | Jiang | | B25J 9/1697 |
| 2019/0232488 A1* | 8/2019 | Levine | | G06N 3/08 |
| 2019/0270200 A1* | 9/2019 | Sakai | | B25J 9/1697 |
| 2019/0299405 A1* | 10/2019 | Warashina | | B25J 9/1697 |
| 2020/0101613 A1* | 4/2020 | Yamada | | B25J 9/1697 |
| 2020/0147804 A1* | 5/2020 | Sugiyama | | G06T 7/73 |

FOREIGN PATENT DOCUMENTS

| | | | | |
|---|---|---|---|---|
| JP | H9-76185 A | | 3/1997 | |
| JP | 2003-211381 A | | 7/2003 | |
| JP | 2003-305676 A | | 10/2003 | |
| JP | 2009-83095 A | | 4/2009 | |
| JP | 2010-188432 A | | 9/2010 | |
| JP | 2018-43338 A | | 3/2018 | |
| JP | 2019150911 A | * 9/2019 | | B25J 9/1664 |

\* cited by examiner

MACHINE LEARNING DEVICE, ROBOT CONTROL DEVICE AND ROBOT VISION SYSTEM USING MACHINE LEARNING DEVICE, AND MACHINE LEARNING METHOD

This application is a new U.S. patent application that claims benefit of JP 2018-065093 filed on Mar. 29, 2018, the content of 2018-065093 is incorporated herein by reference.

BACKGROUND OF THE INVENTION

1. Field of the Invention

The present invention relates to a machine learning device, a robot control device and a robot vision system using the machine learning device, and a machine learning method.

2. Description of Related Art

In robot systems to put robots into predetermined operation, a method called visual feedback, which uses an image captured by a camera provided in a robot, is known (for example, Japanese Unexamined Patent Publication (Kokai) Nos. 2003-211381, 09-076185, 2010-188432 and 2003-305676). With the use of the visual feedback, the robot systems using correction operation can be set up in shorter time.

However, although achieving short setup time, the robot systems have some problems. A first problem is that, for example, a target mark or a feature point must be prepared in advance on a target workpiece. A second problem is that a detection algorithm to detect the target mark or the feature point from a captured image is required. A third problem is that setting know-how to stably detect the prepared target mark or feature point is indispensable. From these viewpoints, operators using the visual feedback still have heavy loads.

SUMMARY OF THE INVENTION

A robot system using conventional visual feedback requires a target mark or a feature point to be prepared in advance on a target workpiece, and therefore has a problem that a heavy load is applied to an operator.

A machine learning device according to an embodiment of the present disclosure includes a state observation unit for observing, as state variables, an image of a workpiece captured by a vision sensor in an arbitrary position, and a movement amount of an arm end portion of a robot from the arbitrary position, the movement amount being calculated so as to bring the image close to a target image; a determination data retrieval unit for retrieving the target image as determination data; and a learning unit for learning the movement amount of the arm end portion to move the arm end portion or the workpiece from the arbitrary position to a target position in accordance with a training data set that is constituted of a combination of the state variables and the determination data. The target position is a position in which the vision sensor and the workpiece have a predetermined relative positional relationship. The target image is an image of the workpiece captured by the vision sensor when the arm end portion or the workpiece is disposed in the target position.

A machine learning method according to an embodiment of the present disclosure includes the steps of storing a position in which a vision sensor and a workpiece have a predetermined relative positional relationship, as a target position; storing an image of the workpiece captured by a vision sensor when an arm end portion of a robot or the workpiece is disposed in the target position, as a target image; observing, as state variables, an image of the workpiece captured in an arbitrary position, and a movement amount of the arm end portion from the arbitrary position, the movement amount being calculated so as to bring the image close to the target image; retrieving the target image from target image memory storing the target image, as determination data; and learning the movement amount to move the arm end portion or the workpiece from the arbitrary position to the target position in accordance with a training data set that is constituted of a combination of the state variables and the determination data.

BRIEF DESCRIPTION OF THE DRAWINGS

The objects, features, and advantages of the present invention will become more apparent from the following detailed description of an embodiment in association with accompanying drawings. In the accompanying drawings.

DETAILED DESCRIPTION OF THE INVENTION

A machine learning device according to an embodiment, a robot control device and a robot vision system using the machine learning device, and a machine learning method will be described below with reference to the drawings. However, it is noted that the technical scope of the present invention is not limited to its embodiment, but extends to an invention described in the scope of claims and equivalents thereof.

Figure 1:
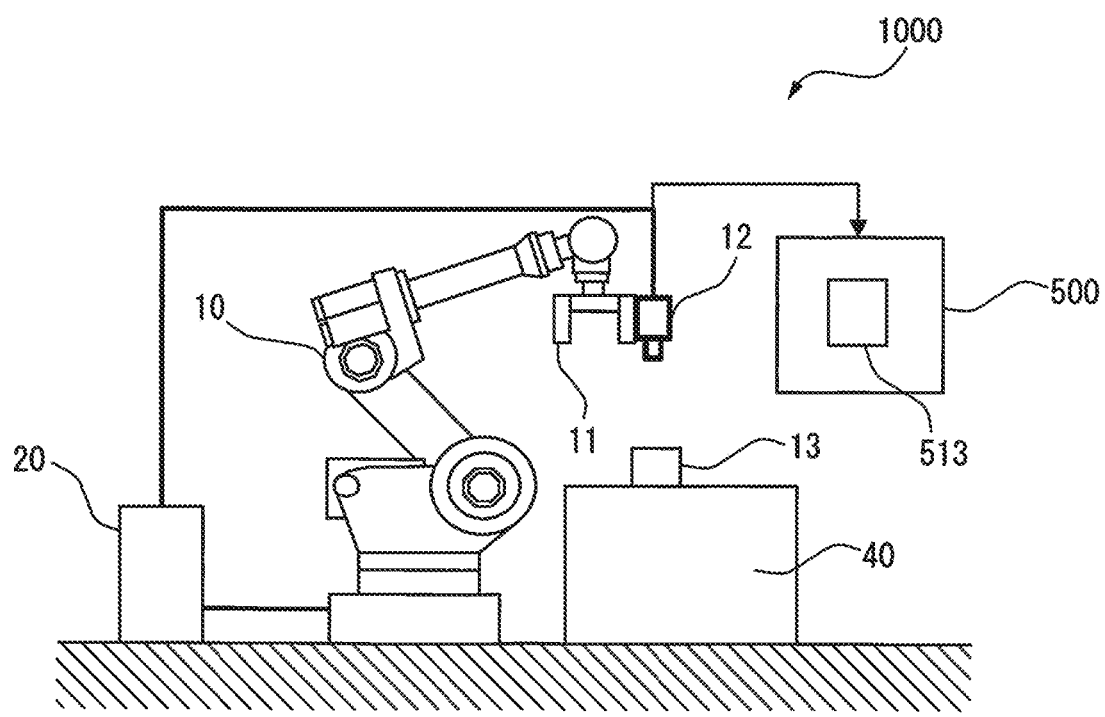
FIG. 1 is a structural diagram of a robot vision system including a machine learning device according to an embodiment.
Figure 2:
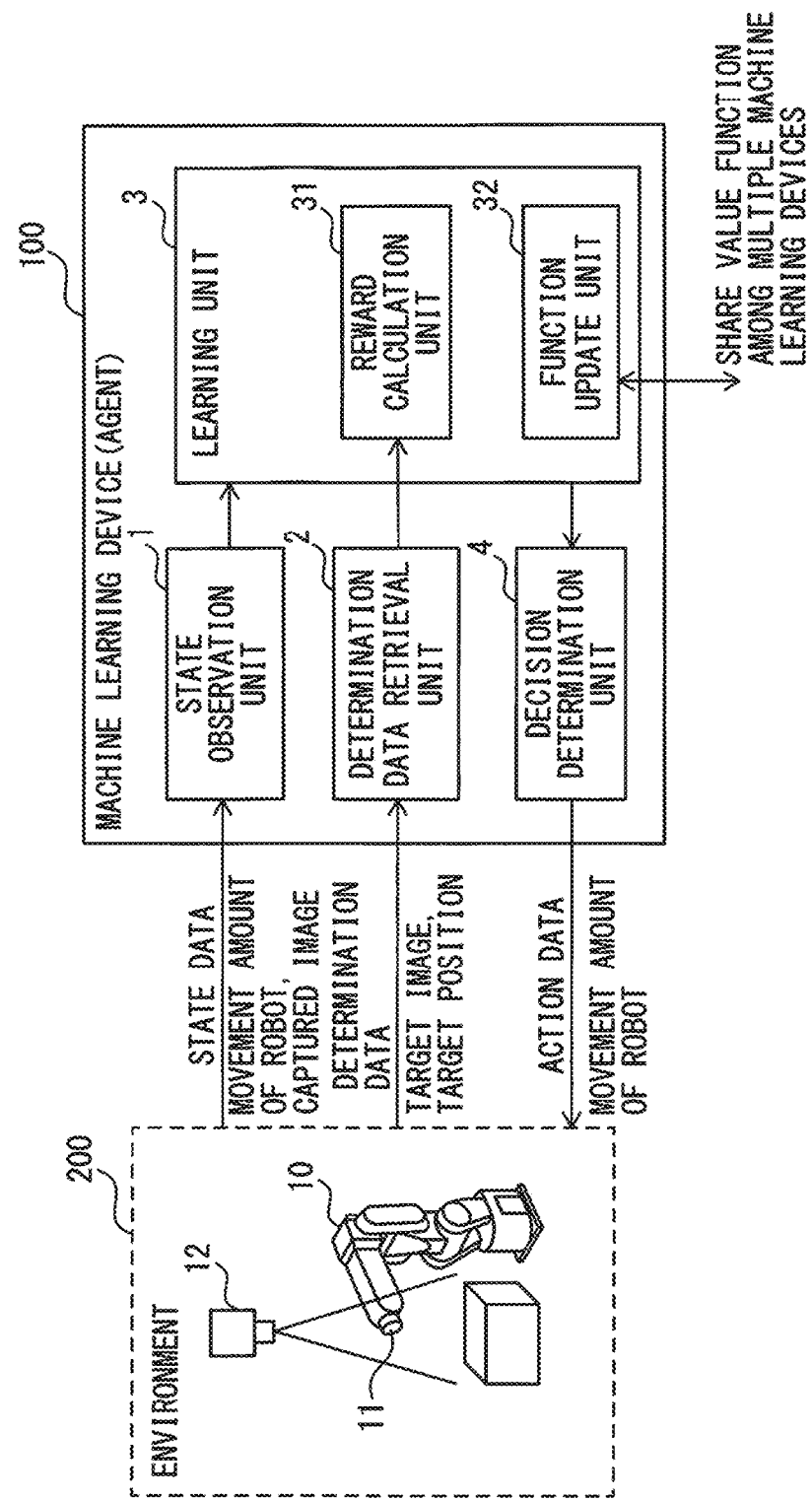
FIG. 2 is a block diagram of the robot vision system including the machine learning device according to the embodiment.

A robot vision system including a machine learning device according to an embodiment will be described. FIG. 1 is a structural diagram of a robot vision system 1000 including a machine learning device according to an embodiment, and FIG. 2 is a block diagram of the robot vision system 1000. The robot vision system 1000 includes a robot control device 20, a robot 10 that performs operation on a workpiece 13 (target object) using a tool attached to an arm end portion 11 and a vision sensor 12 that images the workpiece 13.

The robot 10 is, for example, a six-axis articulated robot that performs predetermined operation on the workpiece 13 disposed on the top of a table 40. For example, if grasping operation is performed on the workpiece 13, a hand is attached to the arm end portion 11. However, not limited to this example, a tool for other operation such as welding or polishing may be attached to the arm end portion 11. The arm end portion 11 can be operated not only in a horizontal direction but also in a vertical direction, and can be also rotated about an axis extending in the vertical direction. The movement of the arm end portion 11 in this manner can adjust an image of the vision sensor 12 provided at the arm end portion 11.

As shown in FIG. 1, the vision sensor 12 is provided at the arm end portion 11 of the robot 10. Alternatively, the vision sensor 12 may be fixedly provided outside of the robot 10. In either case, the vision sensor 12 captures an image of the workpiece 13 to move the arm end portion 11 such that the arm end portion 11 and the workpiece 13 have a target relative positional relationship. The vision sensor 12 may be a two-dimensional camera or a three-dimensional sensor (for example, a range sensor). One vision sensor 12 is provided in FIG. 1, by way of example, but a plurality of vision sensors may be provided instead. For example, the vision sensor may be a stereo camera that performs correction using two two-dimensional cameras.

Even when the vision sensor 12 is fixed on the outside of the robot 10, the arm end portion 11 may be rotated about the axis extending in the vertical direction. An image of the workpiece 13 captured by the vision sensor 12 can be thereby adjusted.

The vision sensor 12 captures an image of the workpiece 13 disposed on the top of the table 40. The captured image is displayed on a display unit 500. For example, when the vision sensor 12 images the workpiece 13, a workpiece image 513 is displayed on the display unit 500.

"Reference position" is a workpiece position used as a standard of reference in performing the predetermined operation on the workpiece 13. For example, the center of a plane on the top of the table 40 may be set as the reference position.

"Target position" is the position of the arm end portion 11 of the robot 10 when the arm end portion 11 and the workpiece 13 have a predetermined relative positional relationship. For example, when the grasping operation is performed on the workpiece 13 using the hand as the arm end portion 11, a position at which the arm end portion 11 can reliably grasp the workpiece 13 may be set as the target position.

Figure 3:
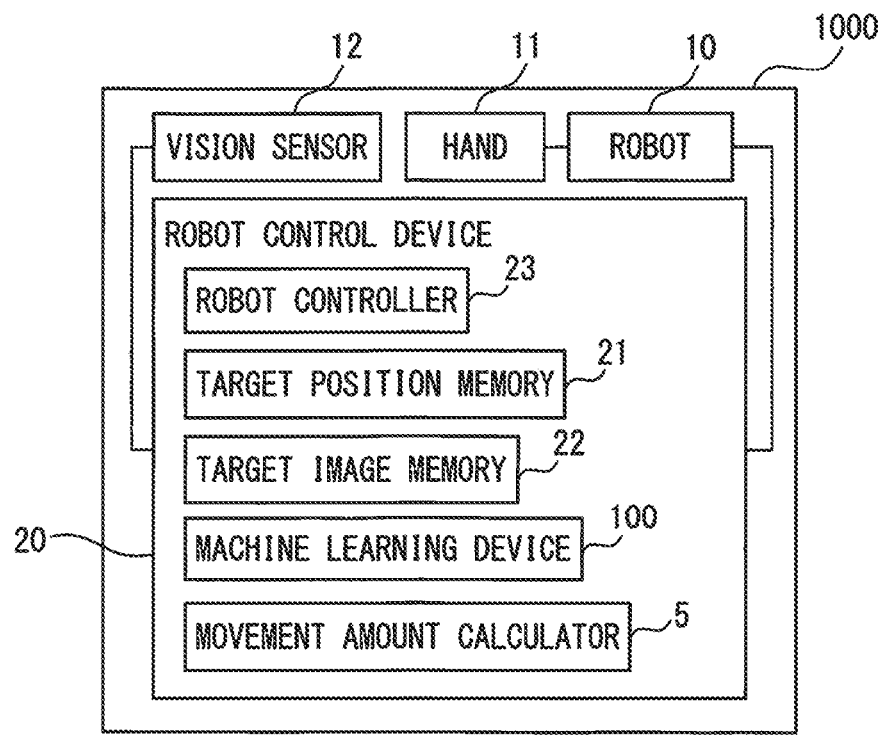
FIG. 3 is a detailed block diagram of the robot vision system including the machine learning device according to the embodiment.

FIG. 3 is a detailed block diagram of the robot vision system including the machine learning device according to the embodiment. The robot vision system 1000 includes the robot 10, the hand, i.e., the arm end portion 11, the vision sensor 12 and the robot control device 20. The robot control device 20 includes target image memory 22, a robot controller 23 and a machine learning device 100. The robot control device 20 may further include target position memory 21 and a movement amount calculator 5.

The target position memory 21 stores the above-described target position. The target image memory 22 stores a target image. "Target image" is an image of the workpiece 13 captured by the vision sensor 12 when the arm end portion 11 is disposed in the target position. As the target position memory 21 and the target image memory 22, a memory device such as a RAM can be used.

The movement amount calculator 5 calculates a movement amount of the arm end portion 11 so as to bring an image of the workpiece 13 captured by the vision sensor 12 close to the target image. The movement amount calculator 5 is realized by software or firmware in a computer (CPU: central processing unit).

The robot controller 23 controls the robot 10 in accordance with a determined operation command. As an example of the operation command, there are a torque command to make the robot 10 execute predetermined operation, etc. The robot controller 23 is realized by software or firmware in the computer.

Figure 4:
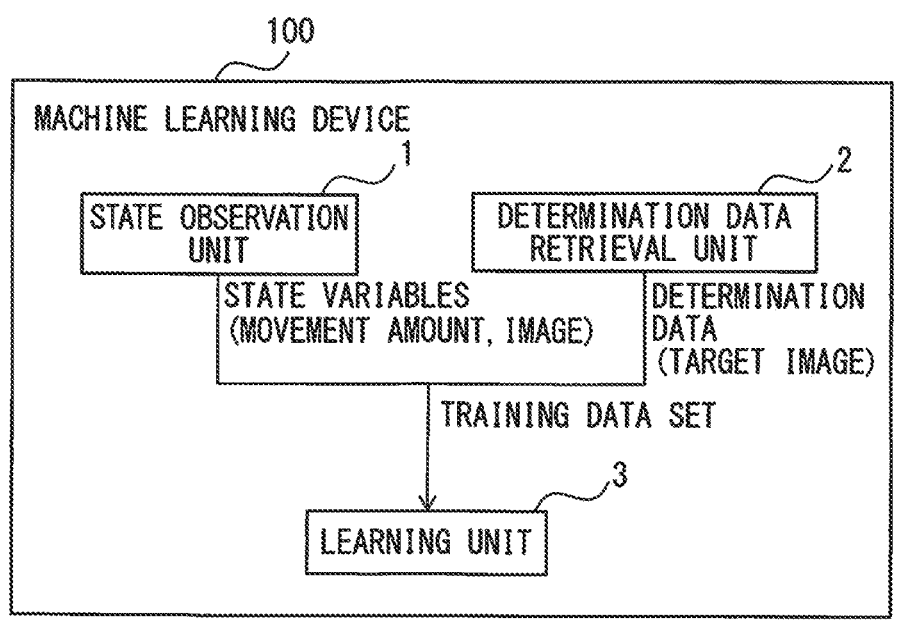
FIG. 4 is a block diagram of the machine learning device according to the embodiment.

Next, the machine learning device according to the embodiment will be described. FIG. 4 is a block diagram of the machine learning device according to the embodiment. The machine learning device 100 includes a state observation unit 1, a determination data retrieval unit 2 and a learning unit 3. The machine learning device 100 is realized by software using a computer that constitutes the robot control device 20.

The state observation unit 1 observes an image of the workpiece 13 captured by the vision sensor 12 in an arbitrary position, and a movement amount of the arm end portion 11 from the arbitrary position, which is calculated to bring the image close to the target image, as state variables.

The determination data retrieval unit 2 retrieves the target image from the target image memory 22, as determination data.

The learning unit 3 learns the movement amount to move the arm end portion 11 from the arbitrary position to the target position in accordance with a training data set, which is constituted of a combination of the state variables and the determination data. When the vision sensor 12 is fixed on the outside of the robot 10, a movement amount of the arm end portion 11 to move the workpiece 13 to such a position (target position) in which the vision sensor 12 and the imaged workpiece 13 have a target relative positional relationship is learned.

In the example of FIG. 2, the movement amount is calculated in accordance with training data sets obtained from one robot 10, but the present invention is not limited to this example. In the machine learning device 100, the learning unit 3 may be configured to learn the movement amount in accordance with training data sets obtained from a plurality of robots.

As shown in FIG. 2, the learning unit 3 preferably includes a reward calculation unit 31 that calculates a reward based on the position of the arm end portion 11 of the robot after movement and the target position, and a function update unit 32 that updates a function to predict a movement amount of the arm end portion 11 from present state variables based on rewards. The function update unit 32 preferably performs reinforcement learning using so-called Q learning. Alternatively, supervised learning, which is described later, may be performed by using data sets of an image of the workpiece 13 captured by the vision sensor 12 disposed in a predetermined position and a movement amount of the arm end portion 11 from the predetermined position to the target position, as labels. In the supervised learning, after the target image and the target position are stored in the reference position, the arm end portion 11 is moved to an appropriate position, and its movement amount and an image in its position are obtained. Preparing a plurality of the sets allows learning of the relationship between variation of the images and the movement amount, and thereby allows automatically obtaining a large number of learning data sets.

The arm end portion 11 may be moved such that an image of the workpiece 13 captured by the vision sensor 12 is brought close to the target image. The closer the position of the robot 10 after the movement, the higher reward may be provided.

Figure 7:
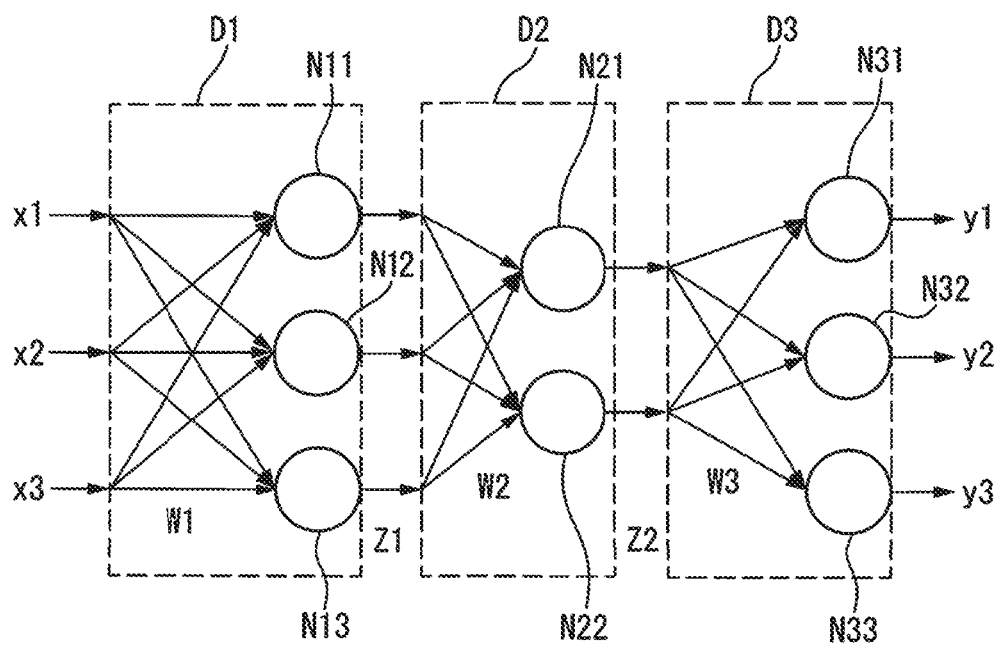
FIG. 7 is a schematic diagram of a three-layer neural network model.

The learning unit 3 preferably updates an action value table corresponding to the movement amount of the arm end portion 11, based on the state variables and the reward. The learning unit 3 preferably calculates the state variables observed by the state observation unit 1 in multilayer structure, and updates the action value table to determine the value of an action in real time. As a method for calculating the state variables in the multilayer structure, for example, a multilayer neural network, as shown in FIG. 7, can be used.

The learning unit 3 may update, based on state variables and a reward of another robot identical to the robot, a value function corresponding to a movement amount of an arm end portion of the other robot. In the example of FIG. 2, an own value function is updated using the value function that has been updated by the learning unit of the machine learning device of itself, but the update is not limited to this. In other words, the own value function may be updated using a value function that has been updated by a learning unit of another machine learning device different from the own machine learning device. For example, a data exchanging unit for exchanging data between a plurality of robot control devices may be further provided, and learning contents by a machine learning device of another robot control device may be used in learning of the own machine learning device.

The learning unit 3 may be configured to relearn and update the movement amount of the arm end portion 11 of the robot 10 in accordance with an additional training data set that is constituted of a combination of present state variables and determination data.

The machine learning device 100 preferably further includes a decision determination unit 4 that determines an operation command for the robot 10 based on the result that the learning unit 3 has performed learning in accordance with the training data set. The decision determination unit 4 calculates a movement amount (action data) of the arm end portion 11 of the robot 10 to bring an image of the workpiece 13 captured by the vision sensor 12 close to the target image, by using the image of the workpiece 13 imaged in a position after movement of the arm end portion 11 as a state variable, and using the target image as determination data. For example, the decision determination unit 4 calculates a movement amount of the arm end portion 11 so as to bring an image of the workpiece 13 captured by the vision sensor 12 provided on the arm end portion 11 of the robot 10 disposed in an arbitrary position close to the target image.

Next, a machine learning method according to the embodiment will be described with reference to a flowchart shown in FIG. 5. First, in step S101, the target position memory 21 stores the position of the arm end portion 11 of the robot 10, when the vision sensor 12 and the workpiece 13 put in a reference position have a predetermined relative positional relationship, as a target position.

Next, in step S102, the target image memory 22 stores an image of the workpiece 13 put in the reference position, which is captured by the vision sensor 12 provided in the arm end portion 11 disposed in the target position, as a target image.

Next, in step S103, the state observation unit 1 measures an image of the workpiece 13 captured by the vision sensor 12 disposed in an arbitrary position and a movement amount of the arm end portion 11 from the arbitrary position, which is calculated so as to bring the image close to the target image, as state variables.

Next, in step S104, the target image is obtained from the target image memory 22, which stores the target image, as determination data.

Next, in step S105, the movement amount to move the arm end portion 11 from the arbitrary position to the target position is learned in accordance with a training data set, which is constituted of a combination of the state variables and the determination data.

Next, in step S106, whether or not the difference between the position of the arm end portion 11 after movement and the target position is a first threshold value or less is determined. When the difference between the position of the arm end portion 11 after movement and the target position is the first threshold value or less, the positional relationship between the vision sensor 12 and the workpiece 13 is determined to be the same as the positional relationship at the time of capturing the target image, and thereby learning is ended. The first threshold value is preferably set within a range in which the robot 10 can perform predetermined operation on the workpiece 13 using a tool attached to the arm end portion 11.

On the other hand, when the difference exceeds the first threshold value, the process returns to step S103, a movement amount of the arm end portion is calculated repeatedly, until the difference between the position of the arm end portion 11 after movement and the target position becomes the first threshold value or less. As described above, after the arm end portion 11 is moved by the movement amount outputted from the machine learning device 100, the decision determination unit 4 repeats its operation until the difference between the position of the arm end portion 11 after the movement and the target position becomes a predetermined threshold value (first threshold value) or less. After movement by the movement amounts obtained by learning of the machine learning device 100, the robot 10 performs predetermined operation at that position as a starting point.

The example of moving the arm end portion 11 is described above, but learning can be performed in the same manner when the vision sensor 12 is provided outside the robot 10. When the vision sensor 12 is provided outside the robot 10, an image that represents the relative positional relationship between the vision sensor 12 and the workpiece 13 captured before movement of the arm end portion 11 and a movement amount are set as state variables, and the movement amount can be learned by setting an image that represents a target relative positional relationship between the vision sensor 12 and the workpiece 13 as determination data (target image).

Figure 5:
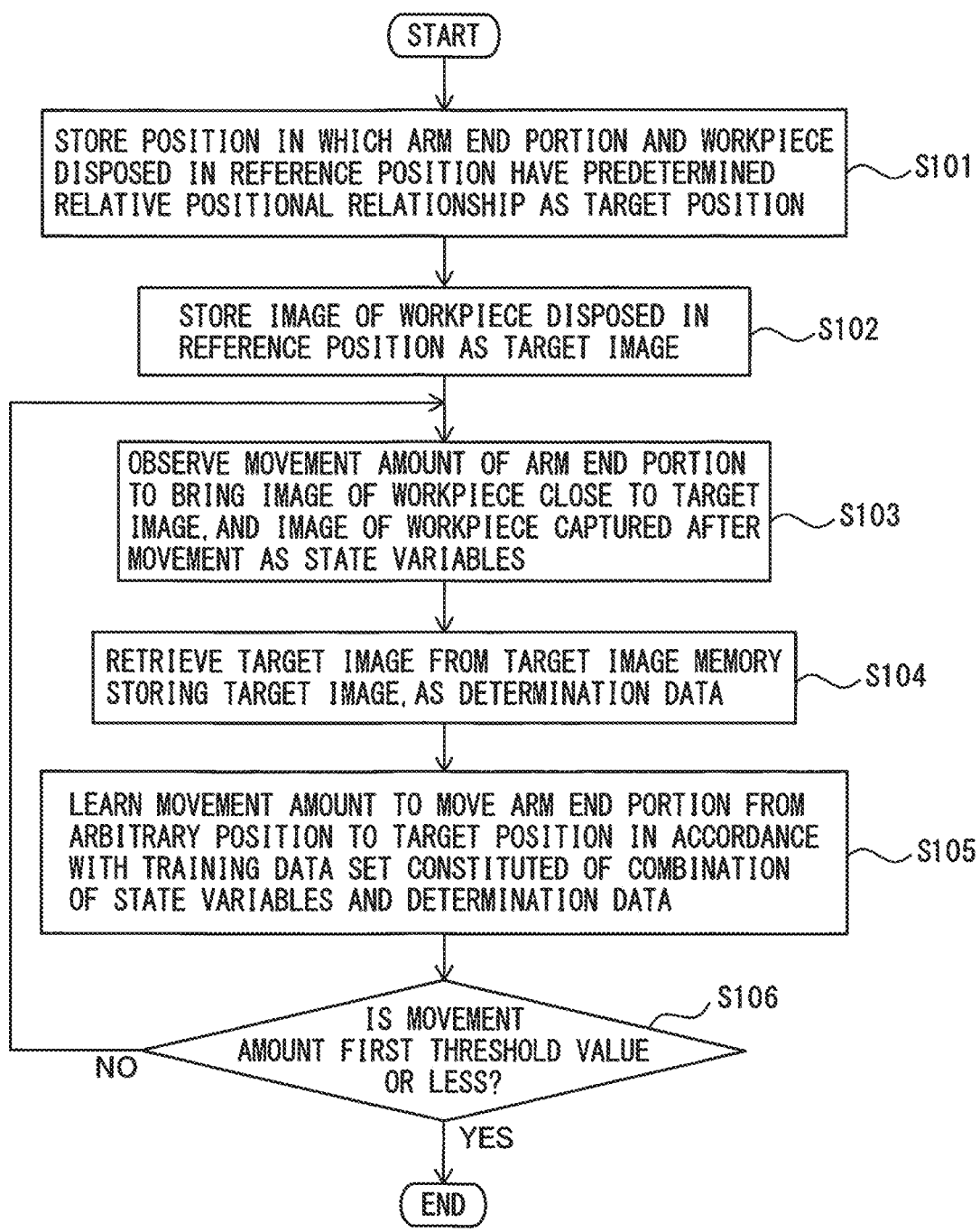
FIG. 5 is a flowchart that explains a procedure of a machine learning method according to the embodiment.

The flowchart of FIG. 5 describes an example in which the magnitude relationship between the difference between the position of the arm end portion 11 after movement and the target position and the first threshold value is determined whenever the arm end portion 11 moves, but the present invention is not limited to this example. In other words, in order to reduce time required for learning, the number of comparisons between the difference between the position of the arm end portion 11 after movement and the target position and the first threshold value may be limited. As a method for limiting the number, for example, the number of comparisons may be determined in advance. Alternatively, the difference between the position of the arm end portion 11 after being moved a predetermined number of times and the target position may be compared with the threshold value just once. Alternatively, the difference between the position of the arm end portion 11 after movement and the target position may be compared with the threshold value in response to a user command.

The machine learning device 100 shown in FIG. 2 will be described in detail. The machine learning device 100 has the function of learning knowledge, as well as the functions of extracting useful rules, knowledge representations, criteria, etc., from a data group inputted to the device by analysis and outputting determination results. There are various methods therefor, which are broadly divided into "supervised learning", "unsupervised learning" and "reinforcement learning". Moreover, when realizing these methods, a method called "deep learning" is used for learning extraction of features themselves.

In "supervised learning", a large amount of data pairs of an input and a result (label) are provided to a learning device (machine learning device). The machine learning device can learn features from the data set, and heuristically obtains a model to predict a result from an input, i.e., the relationship therebetween. In this embodiment, the supervised learning can be used in calculation of a movement amount to move the arm end portion 11 from an arbitrary position to a target position based on a measurement result of the state observation unit 1, including a movement amount of the arm end portion 11 of the robot 10, an image of the workpiece 13, etc., and a reward of the reward calculation unit 31. The above learning can be realized using an algorithm such as a neural network described later.

In "unsupervised learning", only a large amount of input data is provided for a learning device (machine learning device). The machine learning device learns the distribution of the input data and applies compression, classification, alignment, etc., to the input data, without providing corresponding output data as supervisors. Features of the data set can be clustered based on their similarity. With the use of this result, a certain criterion is provided and an output is assigned so as to optimize the criterion, thereby allowing a prediction of the output. There is also a method called "semi-supervised learning" as an intermediate problem setting between "supervised learning" and "unsupervised learning". In "semi-supervised learning", part of data includes pairs of an input and an output, while the other includes only inputs.

In reinforcement learning, problems are set as follows.

The machine learning device 100 observes the state of an environment 200, and determines an action.

The environment 200 varies in accordance with some rule, and besides, an action of the robot itself sometimes varies the environment.

A reward signal returns whenever an action is performed.

The aim is to maximize a total (discount) reward in the future.

The learning is started from a state in which a result brought by an action is never or insufficiently known. The robot control device 20 can obtain the result as data, only after the arm end portion 11 of the robot 10 or the workpiece 13 is actually operated. In other words, it is required to search for an optimal action through trial and error.

The learning may be started from a good start point by performing prior learning (using a method of the above-described supervised learning or inverse reinforcement learning) so as to mimic the action of a human in an initial state.

"Reinforcement learning" is a method for learning an optimal action based on the interaction of an action on an environment by learning the action, as well as determination and classification, in other words, a learning method to maximize a total reward to be obtained in the future. In this embodiment, this indicates that an action having an effect on the future can be obtained. The following description takes Q learning as an example, but the present invention is not limited thereto.

Q learning is a method for learning a Q(s, a) value for selecting an action "a" in a certain environment state "s". In other words, in a certain state "s", an action "a" having the highest Q(s, a) value is selected as an optimal action. However, as to a combination of a state "s" and an action "a", a correct Q(s, a) value is not known at all in the beginning. Thus, an agent (action subject) chooses various actions "a" in a certain state "s", and is provided with a reward for each action "a". Therefore, the agent learns to select a better action, i.e., a correct Q(s, a) value.

As a result of actions, a total reward to be obtained in the future is desired to be maximized. Therefore, the aim is to obtain $Q(s, a) = E[\Sigma \gamma^t r_t]$ (a discount expected value of rewards, γ: discount rate) eventually (an expected value is taken when a state changes in accordance with optimal actions. Since the optimal actions have not been known, as a matter of course, the optimal actions must be found while learning). For example, an update equation for a Q(s, a) value is represented as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad [\text{Equation 1}]$$

where $s_t$ represents an environment state at a time t, and at represents an action at the time t. By executing the action $a_t$, the state changes to $s_{t+1}$. "$r_{t+1}$" represents a reward provided by the state change. A term with "max" represents the product of a Q value, when an action "a" having the highest Q value that has been known at that time is selected in the state $s_{t+1}$, and γ. "γ" is a parameter of $0 < \gamma \le 1$ called discount factor. "α" is a learning rate in the range of $0 < \alpha \le 1$.

This equation indicates a method for updating a Q ($s_t$, $a_t$) value of an action at in a state $s_t$ based on a reward $r_{t+1}$ that has returned as a result of the action $a_t$. This equation indicates that if a Q($s_{t+1}$, max $a_{t+1}$) value of an optimal action "max a" in the next state derived from a reward $r_{t+1}$ plus an action "a" is higher than the Q($s_t$, $a_t$) value of the action $a_t$ in the state $s_t$, Q($s_t$, $a_t$) is increased. If not, Q($s_t$, $a_t$) is decreased. In other words, the value of an action in a certain state is approximated to an optimal action value in the next state that is derived from a reward returning immediately as a result of the action and the action itself.

There are two methods for representing Q(s, a) values in a computer, that is, a method in which Q values of all state-action pairs (s, a) are retained in a table (action value table) and a method in which a function for approximating Q(s, a) values is prepared. In the latter method, the above-described update equation can be realized by adjusting a parameter for an approximation function using a stochastic gradient descent method, etc. As the approximation function, a neural network is usable as described later.

As an approximation algorithm for a value function in the supervised learning, the unsupervised learning and the reinforcement learning, a neural network is usable. The neural network is constituted of, for example, an arithmetic unit, memory, etc., that imitate a neuron model as shown in FIG. 6.

Figure 6:
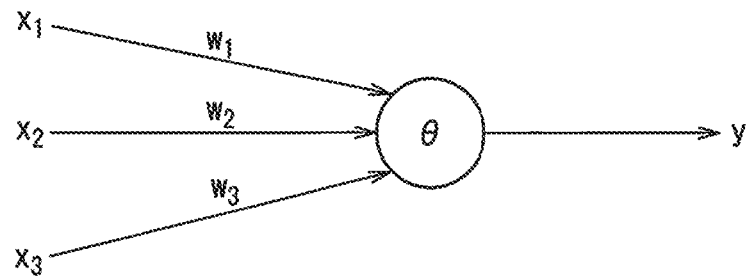
FIG. 6 is a schematic diagram of a neuron model.

As shown in FIG. 6, a neuron produces an output y in response to a plurality of inputs x (inputs $x_1$ to $x_3$, as an example). Each of the inputs $x_1$ to $x_3$ is applied with a weight w ($w_1$ to $w_3$) corresponding to the input x. Thus, the neuron produces the output y represented by the following equation. Note that, all of the input x, the output y and the weight w are vectors.

$$y = f_k\left(\sum_{i=1}^{n} x_i w_i - \theta\right) \qquad \text{[Equation 2]}$$

where $\theta$ is a bias, and $f_K$ is an activation function.

Next, a neural network having weights of three layers, which is constituted of a combination of the above-described neurons, will be described with reference to FIG. 7. FIG. 7 is a schematic diagram of a neural network having weights of three layers D1 to D3.

As shown in FIG. 7, a plurality of inputs x (inputs x1 to x3, as an example) are inputted from the left of the neural network, and a result y (results y1 to y3, as an example) is outputted from the right thereof.

To be more specific, the inputs x1 to x3 are inputted to each of the three neurons N11 to N13 while being weighted correspondingly. The weights applied to the inputs are collectively indicated by W1.

The neurons N1 to N13 output vectors Z11 to Z13, respectively. The vectors Z11 to Z13 are collectively indicated by a feature vector Z1, which is regarded as a vector that extracts feature amounts from the input vectors. The feature vector Z1 is a feature vector between the weight W1 and a weight W2.

The vectors 211 to Z13 are inputted to each of two neurons N21 and N22 while being weighted correspondingly. The weights applied to the feature vectors are collectively indicated by W2.

The neurons N21 and N22 output vectors Z21 and Z22, respectively. The vectors Z21 and Z22 are collectively indicated by a feature vector Z2. The feature vector Z2 is a feature vector between the weight W2 and a weight W3.

The feature vectors Z21 and Z22 are inputted to each of three neurons N31 to N33 while being weighted correspondingly. The weights applied to the feature vectors are collectively indicated by W3.

At last, the neurons N31 to N33 output results y1 to y3, respectively.

The neural network operates in a learning mode or a value prediction mode. In the learning mode, the weight W is learned using a learning data set. In the value prediction mode, the action of the robot 10 is determined using the parameter (the word of "prediction" is used for the sake of convenience, but various tasks including detection, classification, inference, etc., can be made).

In the value prediction mode, data that has been obtained by actual operation of the robot 10 may be immediately learned and reflected in the next action (on-line learning). Also, learning may be collectively performed using a data group collected in advance, and a detection mode may be performed thereafter using the parameter (batch learning). In an intermediate manner, the learning mode may be performed whenever a certain amount of data is accumulated.

The weights W1 to W3 can be learned using an error back propagation algorithm (backpropagation algorithm). Information about an error enters from the right and propagates to the left. The error back propagation algorithm is a method in which each weight is adjusted (learned) with respect to each neuron so as to minimize the difference between an output y in response to an input x and a correct output y (supervisor).

Such a neural network may have layers of more than three (called deep learning). An arithmetic unit that performs feature extraction from inputs in stages and regression of results can be automatically acquired only from supervisor data.

Accordingly, in order to perform the Q learning described above, as shown in FIG. 2, the machine learning device 100 according to this embodiment includes the state observation unit 1, the learning unit 3, and the decision determination unit 4. However, a machine learning method applied to the present invention is not limited to the Q learning. For example, in the instance of applying the supervised learning, a value function corresponds to a learning model, and a reward corresponds to an error.

As shown in FIG. 2, the state of the robot control device 20 includes a state indirectly changed by an action and a state directly changed by an action. The state indirectly changed by an action includes a movement amount of the arm end portion 11 of the robot 10. The state directly changed by an action includes an image of the workpiece 13 after movement of the arm end portion 11 of the robot 10.

The learning unit 3 updates action values that correspond to present state variables and actions that could be taken in the action value table, based on the update equation and the rewards.

The machine learning device 100 may be configured to be connected to the robot control device 20 through a network, and the state observation unit 1 may be configured to transfer a movement amount calculated by the machine learning device 100 to the robot control device 20 through the network. The machine learning device 100 is preferably installed in a cloud server.

After the learning is completed as described above, the robot 10 actually performs operation on the workpiece 13. In actual performance of the operation, the workpiece 13 is put in a different position from the reference position. With the use of the learning device (learning control device) that has learned as described above, the relative relationship between the vision sensor 12 and the workpiece 13 becomes the same as the relative relationship between the vision sensor 12 of the arm end portion 11 of the robot 10 in the target position and the workpiece 13 in the reference position. Note that, single-time learning may not be able to achieve exactly the same relative relationship, but repeated learning is able to bring the relative relationship closer to the same. In other words, the target position memory 21 to store the target position is provided, and while a movement amount is calculated repeatedly, the machine learning device 100 learns the movement amount to move the arm end portion 11 from an arbitrary position to the target position stored in the target position memory 21.

Figure 8:
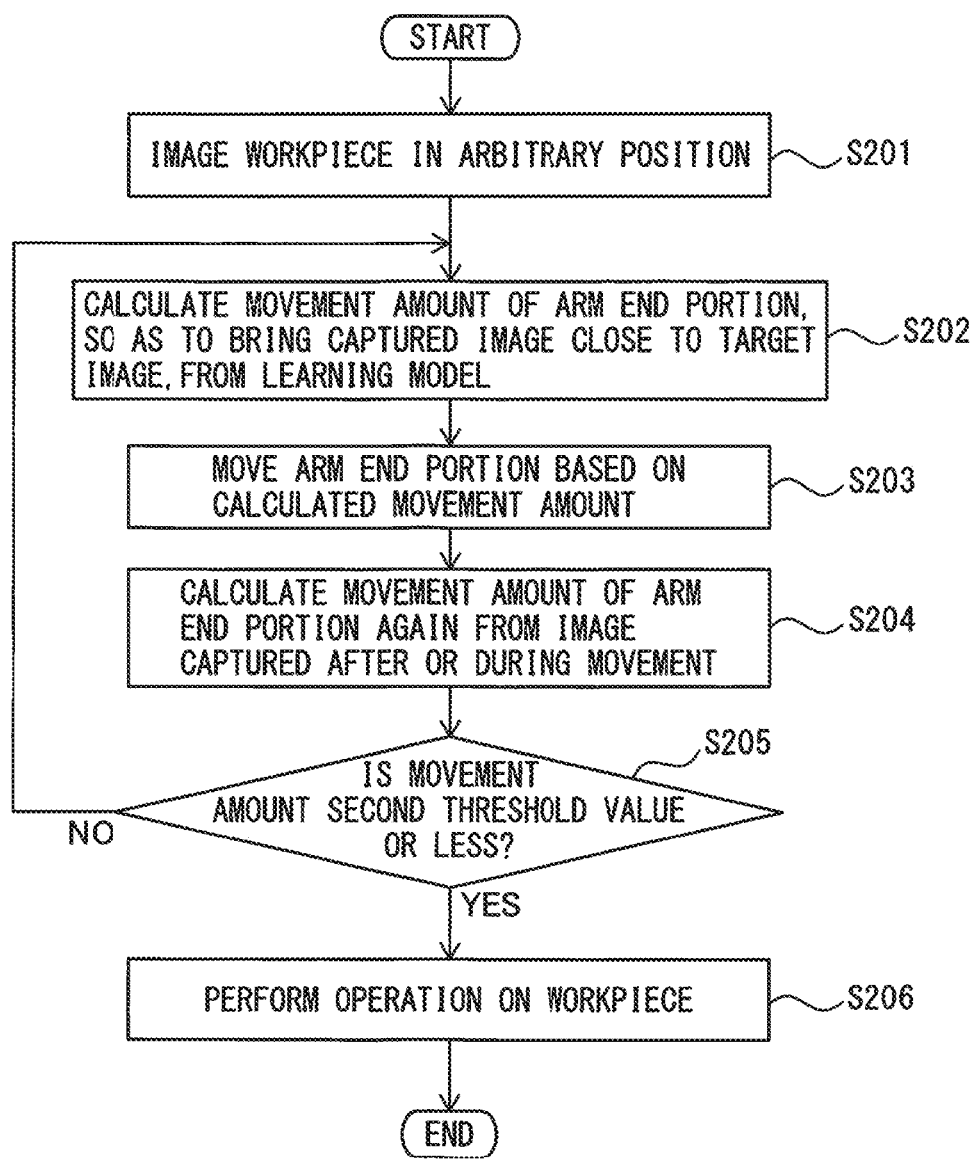
FIG. 8 is a flowchart that explains an operation procedure, after learning has been performed by the machine learning method according to the embodiment.

FIG. 8 is a flowchart that explains an operation procedure after learning is performed by the machine learning method according to the embodiment. First, in step S201, the workpiece 13 put in an arbitrary position is imaged.

Next, in step S202, a movement amount of the arm end portion 11 from an arbitrary position to bring the captured image of the workpiece 13 close to a target image is calculated from a learning model.

Next, in step S203, the arm end portion 11 is moved based on the calculated movement amount.

Next, in step S204, a movement amount of the arm end portion 11 is calculated again from an image of the workpiece 13 captured after or during movement.

Next, in step S205, whether or not the movement amount is a second threshold value or less is determined. When the movement amount is the second threshold value or less, the positional relationship between the vision sensor 12 and the workpiece 13 is the same as that when capturing the target image. In this case, in step S206, operation is performed on the workpiece 13. The second threshold value is preferably set within a range in which the robot 10 can perform the predetermined operation on the workpiece 13 using a tool attached to the arm end portion 11.

On the other hand, when the movement amount exceeds the second threshold value, the operation returns to step S202, a movement amount of the arm end portion 11 is calculated repeatedly until the movement amount becomes the second threshold value or less. As described above, after the arm end portion 11 is moved by the movement amount outputted from the machine learning device 100, the decision determination unit 4 repeats the calculation until the movement amount becomes the predetermined threshold value (second threshold value) or less.

The second threshold value used in performing operation is preferably equal to the first threshold value used in learning, or the first threshold value is preferably less than the second threshold value. By setting the first threshold value less than the second threshold value, the predetermined operation can be performed based on a correct movement amount calculated by the learning.

In the above description, the learning step and the operation performing step are performed separately, but the present invention is not limited to this example. For example, the learning step and the operation performing step may be concurrently performed. Performing the learning step at the same time as the operation performing step allows reducing time required for the learning step, and further improving learning accuracy.

As described above, the robot vision system according to the embodiment allows the robot to move to a target position just by setting a target image, without requiring model (a model pattern to detect an object from an image, i.e., a template by template matching) teaching, a detection algorithm or special know-how.

The machine learning device and the machine learning method according to the embodiment eliminate the need for preparing a target mark or a feature point in advance, before performing predetermined operation on a workpiece using a robot while using an image of the workpiece, thus reducing a burden on an operator.

What is claimed is:

1. A machine learning device comprising:
   a state observation unit for observing, as state variables,
      an image of a workpiece captured by a vision sensor in an arbitrary position, and
      a movement amount of an arm end portion of a robot from the arbitrary position, the movement amount being calculated so as to bring the image close to a target image;
   a determination data retrieval unit for retrieving the target image as determination data;
   a learning unit for learning the movement amount of the arm end portion to move the arm end portion or the workpiece from the arbitrary position to a target position in accordance with a training data set that is constituted of a combination of the state variables and the determination data, the learning unit including
      a reward calculation unit for calculating a reward based on
         (i) a position of the arm end portion of the robot or the workpiece after each successive movement by the movement amount and
         (ii) the target image, and
      a function update unit for updating a function to predict the movement amount of the arm end portion from present state variables based on the reward, wherein
   the target position is a position in which the vision sensor and the workpiece have a predetermined positional relationship, and
   the target image is an image of the workpiece captured by the vision sensor when the arm end portion or the workpiece is disposed in the target position; and
   a decision determination unit for determining an operation command for the robot, based on a result that the learning unit has performed learning in accordance with the training data set,
   wherein the decision determination unit repeats calculation until the movement amount becomes a predetermined threshold value or less, after the arm end portion has been moved by the movement amount outputted from the machine learning device, and
   wherein the machine learning device is installed in a cloud server.

2. The machine learning device according to claim 1, wherein the learning unit is configured to learn the movement amount in accordance with the training data set obtained on a plurality of robots.

3. The machine learning device according to claim 1, wherein the learning unit updates an action value table corresponding to the movement amount of the arm end portion, based on the state variables and the reward.

4. The machine learning device according claim 1, wherein the learning unit updates an action value table corresponding to a movement amount of an arm end portion of another robot identical to the robot, based on state variables and a reward of the other robot.

5. The machine learning device according to claim 1, wherein supervised learning is performed with the use of the image of the workpiece captured by the vision sensor disposed in a predetermined position and a data group of a movement amount of the arm end portion from the predetermined position to the target position, as labels.

6. The machine learning device according to claim 1, wherein the learning unit is configured to relearn and update the movement amount of the arm end portion of the robot in accordance with an additional training data set that is constituted of a combination of present state variables and the determination data.

7. The machine learning device according to claim 1 further comprising: a target position memory for storing the target position, wherein
   while the movement amount is repeatedly calculated, the machine learning device learns the movement amount to move the arm end portion or the workpiece from the arbitrary position to the target position stored in the target position memory.

8. A robot control device comprising:
   the machine learning device according to claim 1;
   a target image memory for storing the target image; and
   a robot controller for controlling the robot in accordance with the determined operation command.

9. A robot vision system comprising:
   the robot control device according to claim 8;
   the robot for performing operation on the workpiece using a tool attached to the arm end portion; and the vision sensor attached to the arm end portion of the robot, for imaging the workpiece.

10. The robot vision system according to claim 9, wherein after the robot has moved to a position by a movement amount obtained by learning of the machine learning device, the robot performs predetermined operation in the position as a starting point.

11. The robot vision system according to claim 9, wherein
the machine learning device is connected to the robot control device through a network, and
the state observation unit transfers a movement amount calculated by the machine learning device to the robot control device through the network.

12. A robot vision system comprising:
the robot control device according to claim 8;
the robot for performing operation on the workpiece using a tool attached to the arm end portion; and
the vision sensor fixed on the outside of the robot, for imaging the workpiece.

13. The robot vision system according to claim 1, wherein the reward calculation unit is configured for calculating a reward based on (i) a position of the arm end portion of the robot or the workpiece after a final movement by the movement amount and (ii) the target image.

14. A machine learning method, comprising:
storing a position in which a vision sensor and a workpiece have a predetermined positional relationship, as a target position;
storing an image of the workpiece captured by a vision sensor when an arm end portion of a robot or the workpiece is disposed in the target position, as a target image;
observing, as state variables, an image of the workpiece captured in an arbitrary position, and a movement amount of the arm end portion from the arbitrary position, the movement amount being calculated so as to bring the image close to the target image;
retrieving the target image from target image memory storing the target image, as determination data;
learning the movement amount to move the arm end portion or the workpiece from the arbitrary position to the target position in accordance with a training data set that is constituted of a combination of the state variables and the determination data, wherein said learning comprises:
calculating a reward based on
(i) a position of the arm end portion of the robot or the workpiece after each successive movement by the movement amount and
(ii) the target image, and
updating a function to predict the movement amount of the arm end portion from present state variables based on the reward;
determining an operation command for the robot, based on a result of the learning in accordance with the training data set; and
repeating calculation until the movement amount becomes a predetermined threshold value or less, after moving the arm end portion by the movement amount,
wherein the method is performed by a machine learning device installed in a cloud server.

* * * * *